United States Patent
Kajiyama (10) Patent No.: US 10,353,275 B2
(45) Date of Patent: Jul. 16, 2019

(54) DISPLAY CONTROLLING APPARATUS AND CONTROLLING METHOD OF DISPLAY CONTROLLING APPARATUS WITH CONTROLLING DISPLAYING IN A DISPLAYING REGION OF A ROW ADJACENT TO A ROW OF A SETTING ITEM

(71) Applicant: CANON KABUSHIKI KAISHA, Tokyo (JP)

(72) Inventor: Hiroyuki Kajiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 14/941,976

(22) Filed: Nov. 16, 2015

(65) Prior Publication Data
US 2016/0154548 A1  Jun. 2, 2016

(30) Foreign Application Priority Data
Dec. 2, 2014  (JP) ................ 2014-244126

(51) Int. Cl.
*G03B 17/14*  (2006.01)

(52) U.S. Cl.
CPC ........ *G03B 17/14* (2013.01); *G03B 2217/002* (2013.01)

(58) Field of Classification Search
CPC ......... G03B 17/14; G06F 9/4443; G06F 8/34; G06F 3/0486; G06F 8/38; G06F 3/0481; G06F 3/0482; G06F 3/04812; G06F 3/04847; G06Q 10/10; H04N 1/00183; H04N 1/00185; H04N 1/00389; H04N 1/00411

See application file for complete search history.

(56) References Cited

U.S. PATENT DOCUMENTS

| 4,952,927 A * | 8/1990 | DeLuca ................. G08B 5/225 340/7.52 |
| 8,694,919 B2 | 4/2014 | Tabata et al. |
| 2004/0160463 A1* | 8/2004 | Battles ................. G06F 3/0482 715/814 |
| 2006/0181681 A1* | 8/2006 | Katsumata ............ G01J 3/2823 352/53 |
| 2008/0180548 A1* | 7/2008 | Kojima .............. H04N 5/23293 348/231.1 |

(Continued)

FOREIGN PATENT DOCUMENTS

| JP | 2010-171961 A | 8/2010 |
| JP | 2012-163631 A | 8/2012 |

*Primary Examiner* — Kieu D Vu
*Assistant Examiner* — Anita D. Chaudhuri
(74) *Attorney, Agent, or Firm* — Venable LLP (57) ABSTRACT

The present invention allows a setting to be changed by checking the current set values of setting items. A display controlling apparatus includes a selecting unit configured to select any of plural setting items arranged as display items in plural rows; an operating unit configured to accept a change command to change a set value of the setting item selected by the selecting unit; and a display controlling unit configured to perform control such that a list of plural candidate values settable for the setting item selected by the selecting unit will be displayed using a display region made up of one of the plural rows, the row being adjacent to the setting item selected by the selecting unit.

20 Claims, 7 Drawing Sheets

(56) References Cited

U.S. PATENT DOCUMENTS

| | | | | |
|---|---|---|---|---|
| 2008/0291852 A1* | 11/2008 | Abel | ........................ | H04L 5/16 |
| | | | | 370/296 |
| 2009/0100373 A1* | 4/2009 | Pixley | ................. | G06F 3/03543 |
| | | | | 715/786 |
| 2010/0149361 A1* | 6/2010 | Takeuchi | .............. | G06T 7/0002 |
| | | | | 348/222.1 |
| 2010/0169835 A1 | 7/2010 | Tabata et al. | | |
| 2011/0058098 A1* | 3/2011 | Ivashin | .............. | H04N 5/23222 |
| | | | | 348/362 |
| 2012/0288264 A1* | 11/2012 | Aoyama | ................ | G03B 13/36 |
| | | | | 396/121 |
| 2013/0083219 A1* | 4/2013 | Heo | ................... | H04N 5/23216 |
| | | | | 348/231.6 |
| 2013/0321285 A1* | 12/2013 | Hoyer | ................... | G06F 3/0488 |
| | | | | 345/173 |
| 2014/0115536 A1* | 4/2014 | Akiya | ................... | G06F 3/0482 |
| | | | | 715/810 |

\* cited by examiner

DISPLAY CONTROLLING APPARATUS AND CONTROLLING METHOD OF DISPLAY CONTROLLING APPARATUS WITH CONTROLLING DISPLAYING IN A DISPLAYING REGION OF A ROW ADJACENT TO A ROW OF A SETTING ITEM

BACKGROUND OF THE INVENTION

Field of the Invention

The present invention relates to a display controlling apparatus and a controlling method of the display controlling apparatus, and more particularly to listing of candidate values for a setting item selected from among plural displayed setting items.

Description of the Related Art

Recently, electronic apparatus equipped with a display screen have come to adopt a setting window which, in making various settings, causes plural setting items and current set values specified for respective setting items to be displayed on the display screen. A user makes settings for various functions by operating buttons while checking setting items and their current set values displayed on the display screen Conventional set value changing methods include a method for changing set values one after another by simply pressing a button. However, with this selection method, it is not known, until the buttons are pressed, what set values are changed in what order. Japanese Patent Application Laid-Open No. 2010-171961 discloses a menu display apparatus which can display a larger number of setting items by displaying display rows of selected setting items behind display rows of unselected setting items while listing selectable candidate values contained in the selected setting items.

SUMMARY OF THE INVENTION

However, with the menu display apparatus disclosed in Japanese Patent Application Laid-Open No. 2010-171961, during the listing of candidate values, since the display rows other than the row for a selected setting item are caused to overlap, only the row containing the selected setting item is visible. This gives rise to a problem in that the user cannot change a set value while looking at the current set values of the setting items contained in the display rows of unselected setting items.

In view of the above problem, an object of the present invention is to allow a setting to be changed by checking the current set values of setting items.

According to the present invention, in changing the set value of a selected setting item, since plural selectable candidate values are listed in a single row by superimposing on a row adjacent to the selected setting item, the setting can be changed by checking the current set values of a larger number of setting items.

According to an aspect of the present invention, a display controlling apparatus comprises: a selecting unit configured to select one or ones from a plurality of setting items as displaying items arranged in a plurality of rows; an operating unit configured to receive a changing operation to change a set value relating to the setting item selected by the selecting unit; and a display controlling unit configured to control a displaying a list of a plurality of candidate values capable of setting relating to the setting item selected by the selecting unit, using a displaying region of a one row adjacent to the setting item selected by the selecting unit, among the plurality of the rows.

Further features of the present invention will become apparent from the following description of exemplary embodiments with reference to the attached drawings.

BRIEF DESCRIPTION OF THE DRAWINGS

FIG. 6, which is composed of FIGS. 6A and 6B, is a flowchart describing procedures for the process of controlling the setting window according to the embodiment.

DESCRIPTION OF THE EMBODIMENTS

Preferred embodiments of the present invention will now be described in detail in accordance with the accompanying drawings.

Figure 1A:
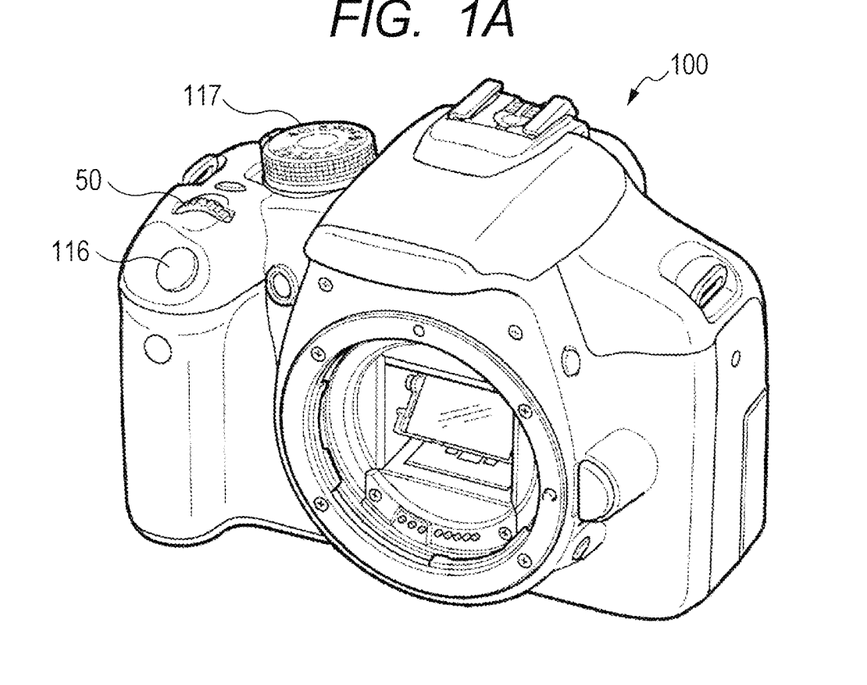
FIGS. 1A and 1B are diagrams showing external appearances of a digital camera according to an embodiment of the present invention.
Figure 1B:
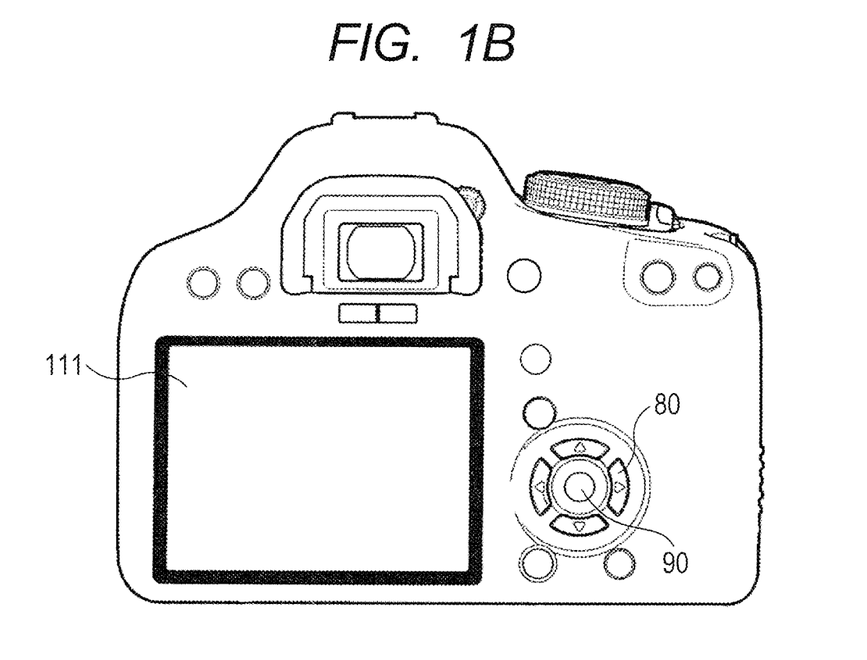

FIGS. 1A and 1B are diagrams showing external appearances of a digital camera as an example of a display controlling apparatus according to the present invention.

A display unit 111 is designed to display images and various information. A shutter button 116 is an operating portion used to give a Shoot command. A mode dial 117 is an operating portion used to switch among various modes. A main dial 50, UP, DOWN, LEFT and RIGHT keys 80, and a SET key 90 are operating members configured to accept commands from the user.

Figure 2:
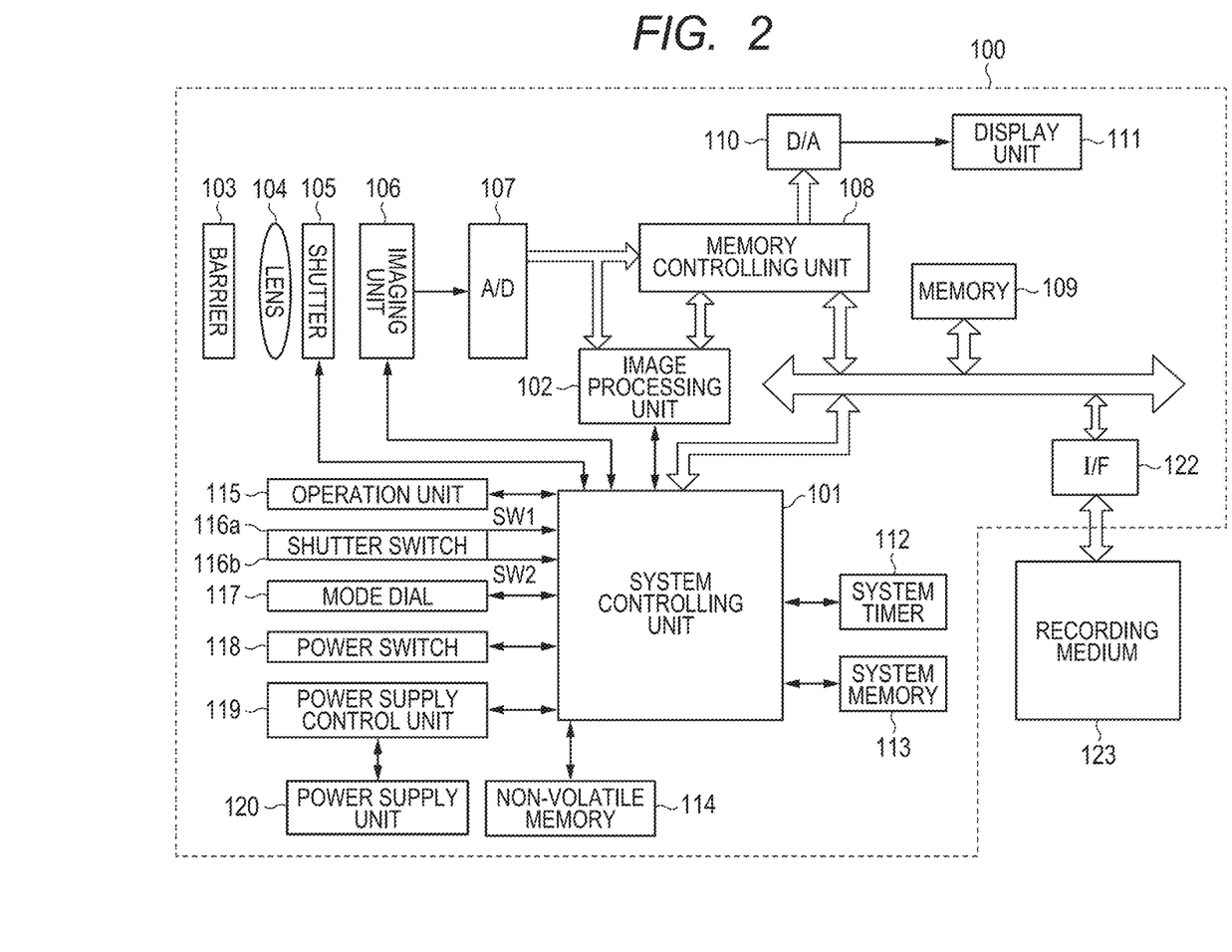
FIG. 2 is a block diagram showing a configuration example of the digital camera according to the embodiment.

FIG. 2 is a block diagram showing a configuration example of a digital camera 100 according to the present embodiment.

In FIG. 2, an imaging lens 104 is a lens group which includes a zoom lens and focus lens. A shutter 105 has an aperture adjustment function. An imaging unit 106 is an imaging device such as a CCD or CMOS device adapted to convert an optical image into an electric signal.

An A/D converter 107 is intended to convert an analog signal into a digital signal, and converts an analog signal output from the imaging unit 106 into a digital signal. A barrier 103 covers an imaging system of the digital camera 100 including the imaging lens 104 and thereby prevents contamination and damage of the imaging system including the imaging lens 104, shutter 105 and imaging unit 106.

An image processing unit 102 performs predetermined pixel interpolation, re-sizing processing such as contraction, and color conversion processing with respect to data from the A/D converter 107 or data from the memory controlling unit 108. Also, the image processing unit 102 performs predetermined computational processing using image data obtained by imaging, and the system controlling unit 101 performs exposure control and focusing control based on computational results thus obtained. Consequently, a TTL (through-the-lens)-based (automatic focusing) process, an AE (automatic exposure) process and an EF (preflashing)

process are carried out. The image processing unit 102 further performs predetermined computational processing using the image data obtained by imaging and performs a TTL-based AWB (automatic white balance) process as well using the computational results obtained by the computational processing.

Output data from the A/D converter 107 is written directly into a memory 109 via the image processing unit 102 and memory controlling unit 108 or via the memory controlling unit 108. The memory 109 stores the image data obtained by the imaging unit 106 and converted into digital data by the A/D converter 107 or image data to be displayed on the display unit 111. The memory 109 has sufficient storage capacity to store a predetermined number of still images or a predetermined duration of moving images and voice.

The memory 109 also serves as an image display memory (video memory). A D/A converter 110 converts image display data stored in the memory 109 into an analog signal and supplies the resulting analog signal to the display unit 111. In this way, the image data for display written into the memory 109 is displayed on the display unit 111 via the D/A converter 110.

The display unit 111 creates a display on an indicator such as an LCD based on the analog signal from the D/A converter 110. The digital signal once converted from analog to digital by the A/D converter 107 and accumulated in the memory 109 is converted to analog by the D/A converter 110. The resulting analog signal is sequentially transferred to and displayed on the display unit 111, allowing the display unit 111 to function as an electronic viewfinder and enabling live view display.

A non-volatile memory 114 is capable of electrically erasing and recording data therein and is made up of, for example, EEPROM or the like. The non-volatile memory 114 stores constants, programs, and the like for operation of the system controlling unit 101. The programs as referred to herein are those used to execute various flowcharts described later in the present embodiment.

The system controlling unit 101 controls the entire digital camera 100. As the programs recorded in the above-mentioned non-volatile memory 114 are executed, various processes of the present embodiment described later are implemented. A RAM is used as a system memory 113. The constants, variables, programs for operation of the system controlling unit 101 are loaded into the system memory 113, where the programs are read out of the non-volatile memory 114. Also, the system controlling unit performs display control by controlling the memory 109, D/A converter 110 and display unit 111.

A system timer 112 is a timekeeper adapted to count time for various types of control as well as to count time for a built-in clock.

A mode dial 117, first shutter switch 116a, and second shutter switch 116b are operating units used to enter various operation commands to the system controlling unit 101. The mode dial 117 switches an operation mode of the system controlling unit 101 to any of a still image recording mode, moving image recording mode, and the like. The still image recording mode includes an auto photo mode, an automatic scene detection mode, a manual mode, various scene modes, a program AE mode, and a custom mode, where photographic settings classified by the photography scene are made in each scene mode.

The mode dial 117 allows the user to directly switch to any of the modes included in the still image shooting mode. Alternatively, after switching to the still image shooting mode once using the mode dial 117, the user may be allowed to switch to any of the modes included in the still image shooting mode using another operating member. Similarly, plural modes may be included in the moving image shooting mode.

The first shutter switch 116a turns ON halfway during operation of the shutter button 116 of the digital camera 100 at so-called half-press (Ready-to-Shoot command) and generates a first shutter switch signal SW1. In response to the first shutter switch signal SW1, operations of the AF (automatic focusing) process, AE (automatic exposure) process, AWB (automatic white balance) process, and EF (preflashing) process are started.

The second shutter switch 116b turns ON at the completion of the operation of the shutter button 116, i.e., at so-called full-press (Shoot command) and generates a second shutter switch signal SW2. In response to the second shutter switch signal SW2, the system controlling unit 101 starts a series of shooting process actions: from a signal read out of the imaging unit 106 to an image data write into the recording medium 123.

When various function icons presented on the display unit 111 are selected and operated, the operating members in the operating portion 115 act as various function buttons, being assigned appropriate functions on a scene by scene basis. Examples of function buttons include an end button, return button, next image button, jump button, refine button, and attribute change button. For example, when a menu button is pressed, a menu screen which allows various settings to be made is displayed on the display unit 111. The user can intuitively make various settings using the menu screen presented on the display unit 111 as well as the four-directional UP/DOWN/LEFT/RIGHT button and SET button.

The main dial 50 shown in FIG. 1A is an operating member capable of being rotated and is used together with the directional button to indicate a selected item. When the main dial 50 is rotated, an electrical pulse signal is generated according to the amount of rotation, and the system controlling unit 101 controls various parts of the digital camera 100 based on the pulse signal. The pulse signal is used to find the angle and number of turns by which the main dial 50 is rotated.

Note that any operating member may be used as the main dial 50, as long as the rotation can be detected. For example, the main dial 50 may be a dial member which generates a pulse signal by itself when rotated by the user. Alternatively, the main dial 50 may be an operating member made up of a touch sensor, where the main dial 50 does not rotate itself and detects a rotating action of a user's finger on the main dial 50 (so-called touch wheel).

A power switch 118 is an operating member used to start up or shut down the digital camera 100. When the power switch 118 is operated by the user, turning ON the digital camera 100, the system controlling unit 101 performs a startup preparation process, and when the power is turned OFF, the system controlling unit 101 performs a shutdown process.

The power supply control unit 119 includes a battery detection circuit, a DC-DC converter, and a switching circuit adapted to switch the block to be energized, and detects whether or not a battery has been mounted, the type of battery, and remaining battery power. Also, based on results of the detection and instructions from the system controlling unit 101, the power supply control unit 119 supplies required voltages to various parts including the recording medium 123 for required periods by controlling the DC-DC converter.

The power supply unit 120 is made up of a primary battery such as an alkaline cell or lithium cell, a secondary battery such as a NiCd cell, NiMH cell or Li cell, or an AC adapter. A recording medium I/F 122 is an interface with a recording medium 123 such as a memory card or hard disk. The recording medium 123 such as a memory card is intended to record photographed images and made up of a semiconductor memory or magnetic disk.

According to the present embodiment, a "setting window" is a menu screen used to make settings for the digital camera 100, and plural setting items are arranged as display items in a matrix to provide choices, allowing the user to change settings of individual setting items by selecting the setting items. Also, a "detailed setting window" displays a guidance, describing available set values for any desired setting item of the digital camera and allowing the user to change the setting by following the guidance.

Operation of the embodiment of the present invention will be described below with reference to FIGS. 3 to 6.

Figure 3:
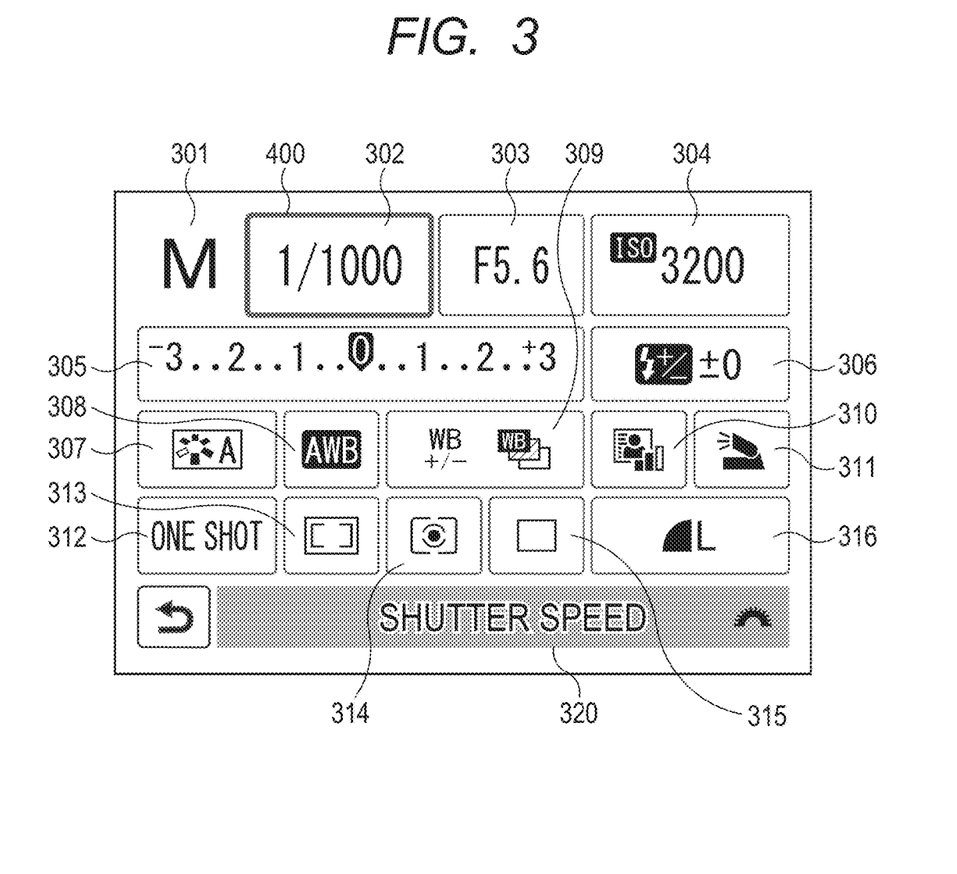
FIG. 3 is a diagram showing a display example of a setting window according to the embodiment.

FIG. 3 is a diagram showing a display example of the setting window. Setting items 301 to 316 are displayed in a matrix, and one of the setting items, i.e., the setting item 302 of shutter speed is selected. A focus frame 400 is displayed over a selected setting item (hereinafter referred to as a selected item), indicating that the setting item is selected.

Although in the example described in the present embodiment, the focus frame 400 is used to indicate a selected item, the present invention is not limited to a frame display, and the selected item may be indicated by changing its color from the other items, displayed in a larger size than other items, or displayed by being marked to indicate selected status. Also, a guide display concerning the selected item is provided in a guide region 320.

In the example of FIG. 3, in which the setting item 302 of shutter speed is selected, the "shutter speed" which is the item name of the setting item 302 is displayed in the guide region 320, allowing the user to identify that the currently selected setting item is shutter speed. In the setting window, plural setting items are arranged over almost an entire display region to display each setting item in as large a size as possible, giving high visibility to the presented setting items.

FIGS. 4A to 4F show display examples in which one of the setting items is selected in the setting window, candidate values, which are choices for the selected item, are listed, and a guide display concerning the selected item is provided.

Figure 4A:
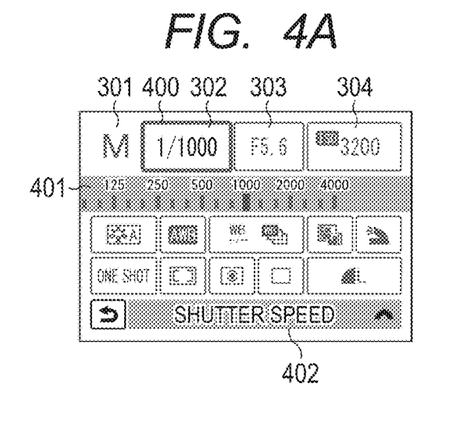
FIGS. 4A, 4B, 4C, 4D, 4E and 4F are diagrams showing display examples of how candidate values are listed according to a row to which a selected setting item belongs, in the embodiment.

FIG. 4A shows an example in which the setting item 302 of the shutter speed is selected and a list 401 of candidate values and a guide 402 for the selected item are displayed, where the candidate values are choices for the setting item 302. The list 401 of candidate values is displayed by being superimposed on the row (second row) directly under the first row in which the selected item is placed. That is, the setting items 305 and 306, which are displayed in the second row when the list 401 is not displayed, are hidden from display by the list 401. At the location of the setting item 302, the current set value of the shutter speed is displayed as a numeric value. Also, in the list 401 of candidate values, the current set value is displayed in color so as to be identifiable.

Figure 4B:
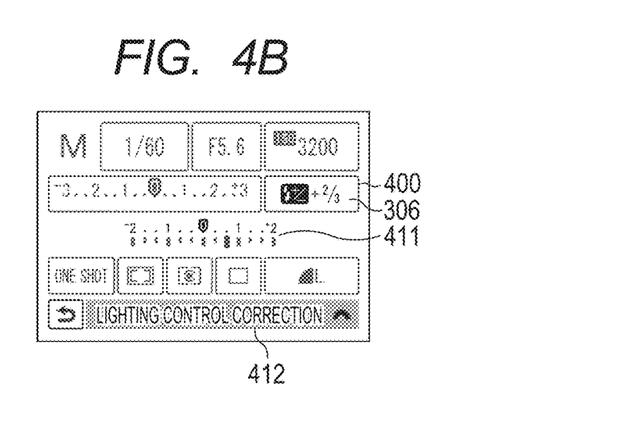

FIG. 4B shows an example in which the setting item 306 of lighting control correction is selected, and a list 411 of candidate values and a guide 412 for the selected item are displayed, where the candidate values are choices for the setting item 306. The list 411 of candidate values is displayed by being superimposed on the row (third row) directly under the second row in which the selected item is placed. That is, the setting items 307 to 311, which are displayed in the third row when the list 411 is not displayed, are hidden from display by the list 411. At the location of the setting item 306, the current set value of the lighting control correction is displayed as a numeric value. Also, in the list 411 of candidate values, the current set value is displayed in color so as to be identifiable.

Figure 4C:
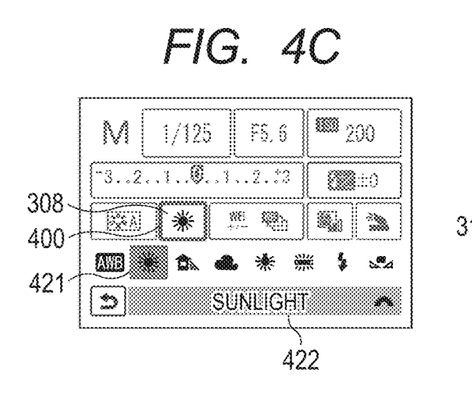

FIG. 4C shows an example in which the setting item 308 of white balance is selected, and a list 421 of candidate values and a guide 422 for the selected item are displayed, where the candidate values are choices for the setting item 308. The list 421 of candidate values is displayed by being superimposed on the row (fourth row) directly under the third row in which the selected setting item 308 is placed.

That is, the setting items 312 to 316, which are displayed in the fourth row when the list 421 is not displayed, are hidden from display by the list 421. At the location of the setting item 308, the current set value of the white balance is displayed as a graphic symbol (icon). Also, in the list 421 of candidate values, the current set value is displayed in reverse video or in color so as to be identifiable. Furthermore, in the guide 422, a character string ("sunlight" in the illustrated example) which represents the current set value is displayed instead of the item name of the selected item.

Figure 4D:
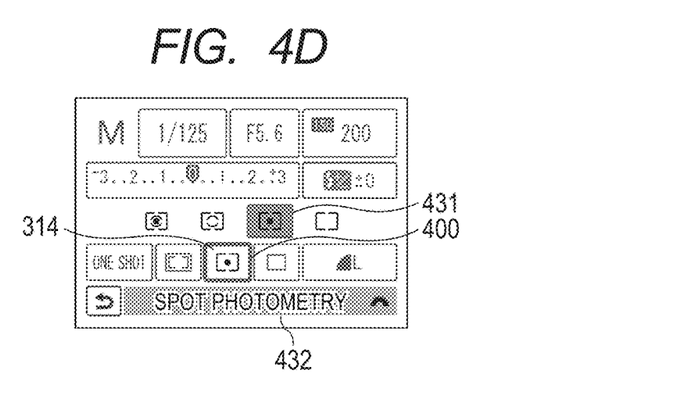

FIG. 4D shows an example in which the setting item 314 of metering mode is selected, and a list 431 of candidate values and a guide 432 for the selected item are displayed, where the candidate values are choices for the setting item 314. In order not to hide the guide 432, the list 431 of candidate values is displayed by being superimposed on the row (third row) directly above the fourth row in which the selected setting item 314 is placed.

That is, the setting items 307 to 311, which are displayed in the third row when the list 431 is not displayed, are hidden from display by the list 431. At the location of the setting item 314, the current set value of metering mode is displayed as a graphic symbol (icon). Also, in the list 431 of candidate values, the current set value is displayed in reverse video or in color so as to be identifiable. Furthermore, in the guide 432, a character string ("spot metering" in the illustrated example) which represents the current set value is displayed instead of the item name of the selected item.

Figure 4E:
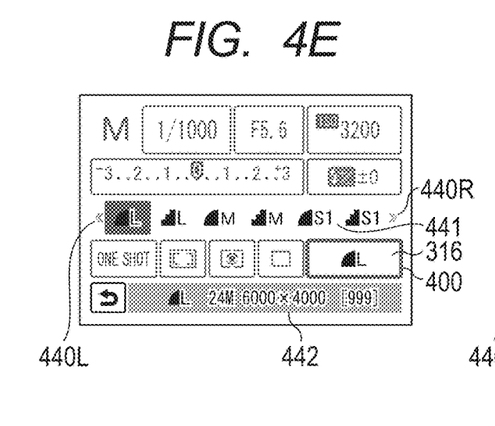
Figure 4F:
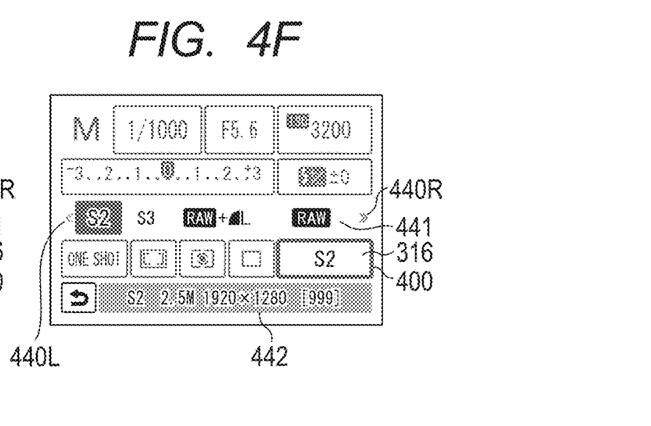

FIGS. 4E and 4F show examples in which the setting item 316 of recording image quality is selected, and a list 441 of candidate values and a guide 442 for the selected item are displayed, where the candidate values are choices for the setting item 316. There are a larger number of choices for the setting item of recording image quality than the number (predetermined number) of choices which can fit in one row of the display region for the list 441. Therefore, only part of all the choices is listed at a time by arranging the candidate values over plural pages.

In so doing, marks 440L and 440R are displayed, indicating to the user that plural pages are available (other choices can be displayed by scrolling). At the location of the setting item 316, the current set value of the recording image quality is displayed as a graphic symbol (icon). Also, in the list 441 of candidate values, the current set value is displayed in reverse video or in color so as to be identifiable. Furthermore, in the guide 442, character strings (in the illustrated example, numeric values which represent the amount of image data, number of pixels, and number of remaining shots at the set image quality) which represent the current set value are displayed instead of the item name of the selected item.

When a set value is expressed numerically on a setting item as with the setting item 302 of shutter speed in FIG. 4A and setting item 306 of lighting control correction in FIG.

4B, if the current set value is displayed as a numeric value in the guide region, this will become redundant with the display on the setting item. Therefore, in this case, the name of the setting item rather than the set value is displayed in the guide region.

On the other hand, the setting item 308 of white balance in FIG. 4C, setting item 314 of metering mode in FIG. 4D, and setting item 316 of recording image quality in FIG. 4E are displayed as follows. That is, when the set value on a setting item is a graphic symbol or characters other than numeric values or is expressed by a combination thereof, the current set value rather than the name of the setting item is displayed in the guide region.

When the set value on a setting item is expressed numerically as shown in FIGS. 4A and 4B, even if the set value is changed, the user can understand the current set value by simply looking at the numeric value.

On the other hand, as shown in FIGS. 4C to 4E, when the set value on a setting item is a graphic symbol or characters other than numeric values or is expressed by a combination thereof, the set value is displayed as follows. That is, to understand the set value, the user also checks the guide region in which the name of the set value or the numeric value of the set value is displayed.

Consequently, when candidate values on a setting item are expressed by a graphic symbol or characters other than numeric values or by combinations thereof, a list of choices is displayed for a longer time than when the candidate values are displayed numerically on the setting item. That is, display times of the lists 421, 431 and 441 are set longer than display times of the lists 401 and 411. Therefore, when the candidate values on a setting item are expressed by a graphic symbol or characters other than numeric values or by combinations thereof, names or numerical meanings of the candidate values become easier to check.

In listing candidate values, in order to reduce the amount of information hidden by the list, a single row rather than plural rows is used for the list as shown in FIGS. 4A to 4F. Also, in order for the user to see that candidate values for the selected item are listed, the list is displayed in a row adjacent to the selected setting item. In so doing, the list is displayed in such a location as not to hide the selected item and guide region.

In the setting window, the setting item 301 of shooting mode, setting item 302 of shutter speed, setting item 303 of aperture value, and setting item 304 of ISO sensitivity are arranged in the first row. As also can be seen from FIGS. 4A to 4F, from whatever row a setting item may be selected in displaying a list, the above-mentioned setting item group (301 to 304) placed in the first row is not hidden. The user can change the setting by checking the current set values of the above-mentioned setting item group.

This is because information about shooting mode, shutter speed, aperture value and ISO sensitivity is particularly important for an imaging apparatus, and in changing the set value of whatever setting item, it is required that the set value can be adjusted by looking at the information. For example, when adjusting white balance, some users decide what set value to select by taking into consideration three elements of exposure: shutter speed, aperture value and ISO sensitivity.

The list of candidate values is displayed by being superimposed on setting items, and in the examples of FIGS. 4A to 4F, icons (items) of the setting items other than the selected item are faded in color. This allows the user to distinguish (identify) between a portion listing the candidate values for the selected item and display of the other setting items. Besides the identification based on differences in color density, the list and setting item display may be distinguished from each other by displaying a frame line around a region of the list or by coloring the region of the list in red or orange.

Figure 5A:
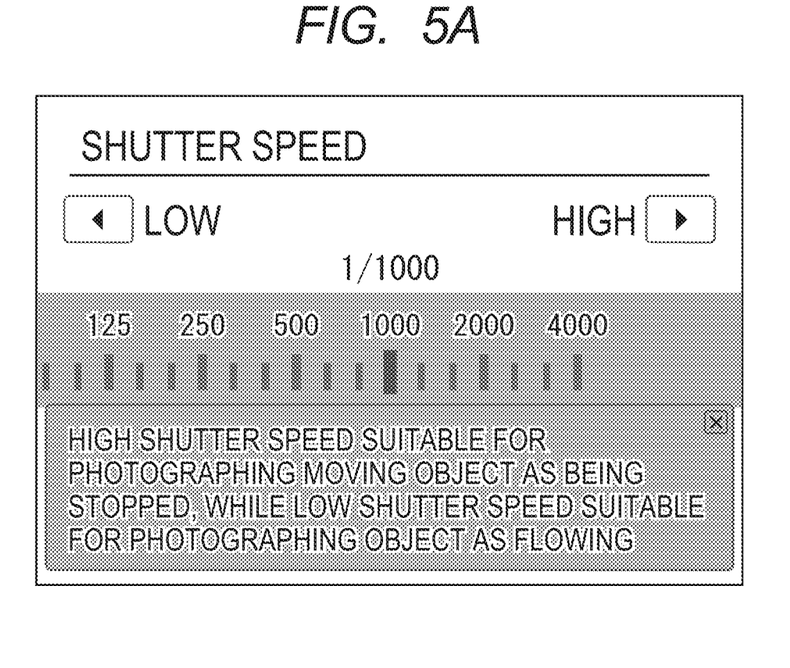
FIGS. 5A and 5B are diagrams showing display examples of detailed setting windows according to the embodiment.
Figure 5B:
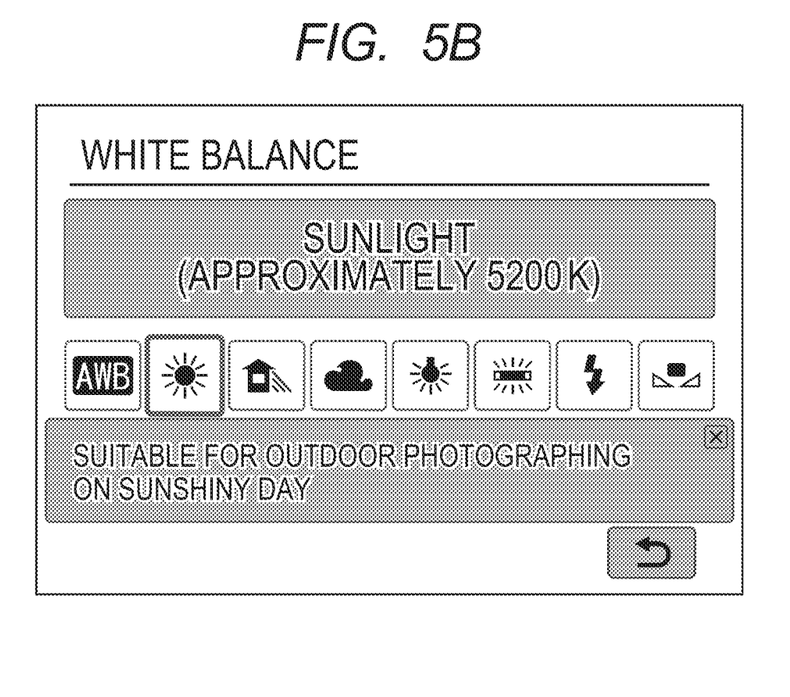

FIG. 5A shows a display example of a detailed setting window for the setting item 302 of shutter speed and FIG. 5B shows a display example of a detailed setting window for the setting item 308 of white balance.

The lists of candidate values on the setting windows shown in FIGS. 4A and 4B correspond, respectively, to candidate value displays on the detailed setting windows for individual setting items shown in FIGS. 5A and 5B. This mode of display can avoid causing confusion to the user.

Figures 6, 6A:
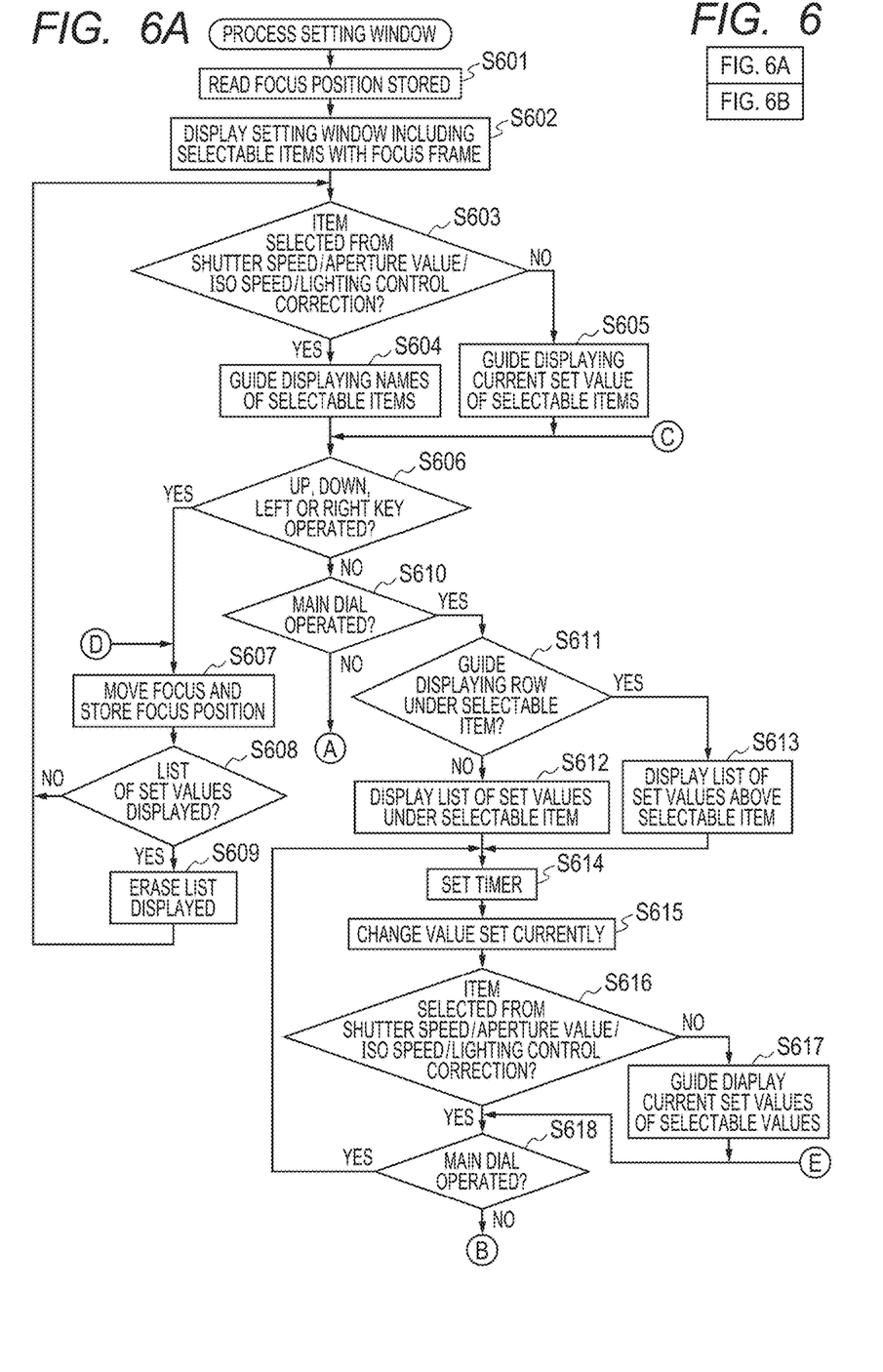
Figure 6B:
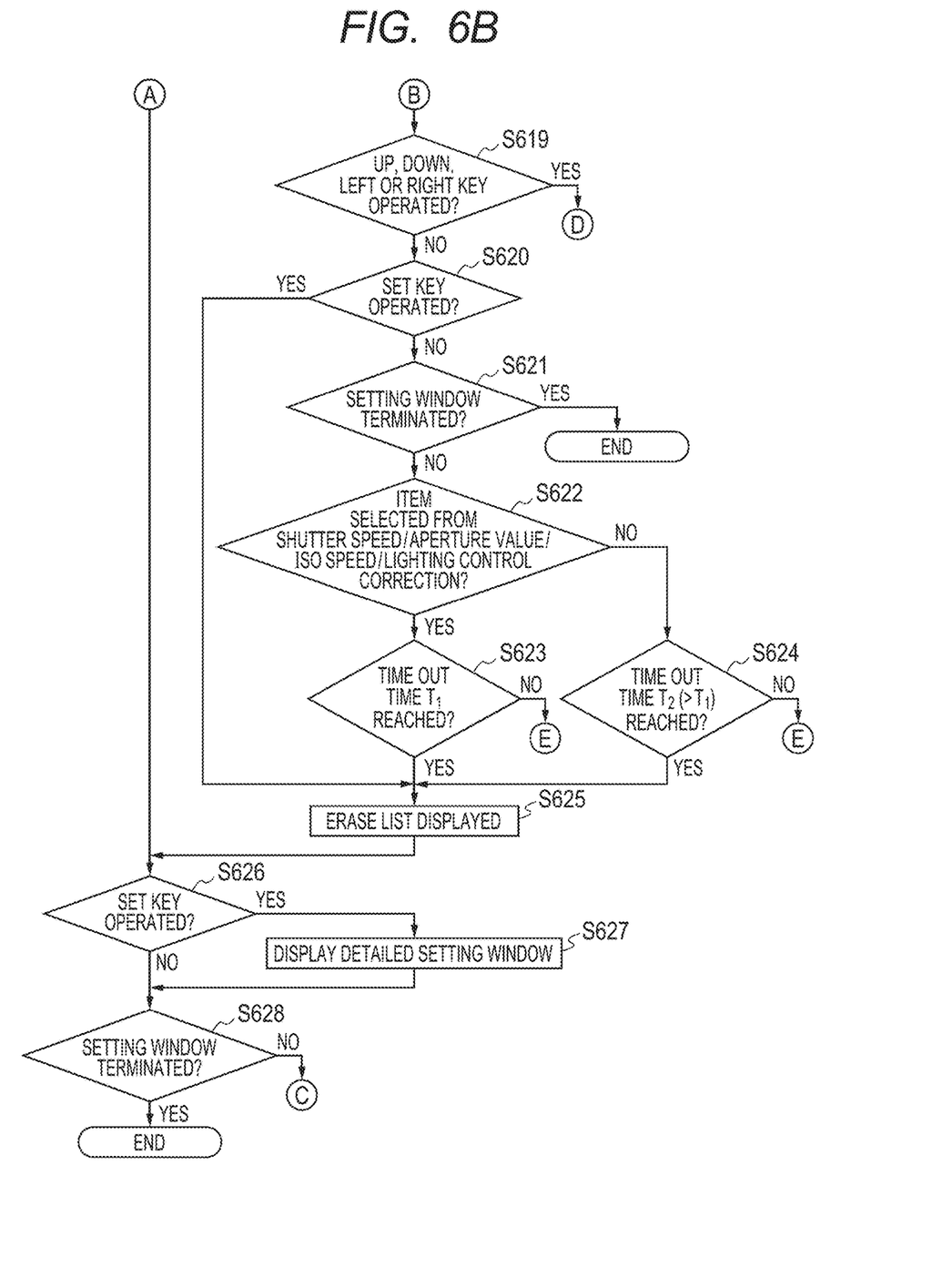

FIG. 6 shows a flowchart describing procedures for a setting window process of accepting setting operations from the user on the above-mentioned setting window. This process is implemented by a program stored in the non-volatile memory 114, read into the system memory 113, and executed by the system controlling unit 101.

When the digital camera 100 is turned on and a command to display a setting window is given, the process of FIG. 6 is started. Note that in the process of FIG. 6, whenever the shutter button 116 is half-pressed or full-pressed, actions of the above-mentioned AF process, AE process, AWB process and EF process or a series of shooting process actions are carried out based on the set values at the time.

In S601, the system controlling unit 101 reads a focus position (information about the item to be selected or information about the position at which a focus frame should be placed) stored in the non-volatile memory 114.

In S602, the system controlling unit 101 places the focus frame 400 on the item of the focus position read in S601 and displays a selection window on the display unit 111.

In S603, the system controlling unit 101 determines whether or not the currently selected item (item over which the focus frame is placed) is any of the setting item 302 of shutter speed, setting item 303 of aperture value, setting item 304 of ISO sensitivity, and setting item 306 of lighting control correction. If the currently selected item is any of these setting items, the system controlling unit 101 goes to S604, but otherwise goes to S605.

In S604, the system controlling unit 101 displays the name of the selected item in the guide region 320. A display example at this time is shown in FIG. 3.

In S605, the system controlling unit 101 displays the current set value of the selected item in the guide region 320. For example, if the selected item is the setting item 308 of white balance, the character string "sunlight," which is the current set value, is displayed. Also, if the selected item is the setting item 316 of recording image quality, the name of the current set value as well as the recording capacity, number of pixels, and number of remaining shots for the set value are displayed.

In S606, the system controlling unit 101 determines whether or not any of the UP, DOWN, LEFT and RIGHT keys 80 has been pressed. If any of the keys 80 has been pressed, the system controlling unit 101 goes to S607, but otherwise goes to S610.

In S607, the system controlling unit 101 moves the focus frame in the direction corresponding to one of the UP, DOWN, LEFT and RIGHT keys whichever has been pressed and changes the selected item. Also, the system controlling unit 101 records information (focus position) about the moved focus frame in the non-volatile memory 114.

In S608, the system controlling unit 101 determines whether or not choices for the selected item are listed. If choices are listed, the system controlling unit 101 goes to S609, but otherwise returns to S603.

In S609, the system controlling unit 101 erases the displayed list of choices for the selected item. Consequently, the setting items hidden hitherto by the list become visible.

In S610, the system controlling unit 101 determines whether or not the main dial 50 has been operated. If it is determined that the main dial 50 has been operated, the system controlling unit 101 goes to S611, but otherwise goes to S626.

In S611, the system controlling unit 101 determines whether or not the row directly below the selected item is a guide display row in which the guide region 320 is located. If it is determined that the row directly below the selected item is not a guide display row, the system controlling unit 101 goes to S612, and if it is determined that the row directly below the selected item is a guide display row, the system controlling unit 101 goes to S613.

In S612, the system controlling unit 101 lists candidate values for the selected item in the row directly below the selected item. Display examples at this time are shown in FIGS. 4A to 4C.

In S613, the system controlling unit 101 lists candidate values for the selected item in the row directly above the selected item. This keeps the guide region 320 in which the guide is displayed from being hidden by the list. Display examples at this time are shown in FIGS. 4D to 4F.

In S614, the system controlling unit 101 starts a timer to count the time until the list of candidate values for the selected item is hidden automatically. More specifically, information about the current time acquired from the system timer 112 is substituted into a variable of listing start time stored in the system memory 113.

In S615, the system controlling unit 101 changes the current set value of the selected item according to the operation of the main dial 50 determined in S610. When the main dial 50 is operated (rotated) under conditions in which no list is displayed, the set value may be changed while displaying a list in this way or only a list may be displayed without changing the set value merely upon a single click of rotating operation. In the latter case, the set value may be changed in response to the second or subsequent click of rotating operation.

In S616, the system controlling unit 101 determines whether or not the currently selected item (item over which the focus frame is placed) is any of the setting item 302 of shutter speed, setting item 303 of aperture value, setting item 304 of ISO sensitivity, and setting item 306 of lighting control correction. If the currently selected item is any of these setting items, the system controlling unit 101 goes to S618, but otherwise goes to S617.

In S617, the system controlling unit 101 displays the current set value of the selected item in the guide region 320. That is, the system controlling unit 101 updates the display of the guide region 320 according to the set value changed in S615.

In S618, the system controlling unit 101 determines whether or not the main dial 50 has been operated. If it is determined that the main dial 50 has been operated, the system controlling unit 101 goes to S614 to reset (restart) the timer, and then changes the set value in S615 according to the operation of the main dial 50. If the main dial 50 has not been operated, the system controlling unit 101 goes to S619.

In S619, the system controlling unit 101 determines whether or not any of the UP, DOWN, LEFT and RIGHT keys 80 has been pressed. If any of the keys 80 has been pressed, the system controlling unit 101 goes to S607, but otherwise goes to S620.

In S620, the system controlling unit 101 determines whether or not the SET key 90 (set button) has been pressed. If the SET key 90 is pressed, the system controlling unit 101 goes to S625 and finishes listing.

In S621, the system controlling unit 101 determines whether or not an exit command has been issued to finish the display on the setting window. Possible exit commands include a press of the menu button, press of the playback button (command to enter a playback mode), power OFF action, and press of a live view start button. If an exit command has been issued, the system controlling unit 101 finishes the setting window process, but otherwise goes to S622.

In S622, the system controlling unit 101 determines whether or not the currently selected item (item over which the focus frame is placed) is any of the setting item 302 of shutter speed, setting item 303 of aperture value, setting item 304 of ISO sensitivity, and setting item 306 of lighting control correction. If the currently selected item is any of these setting items, the system controlling unit 101 goes to S623, but otherwise goes to S624.

In S623, the system controlling unit 101 determines whether or not a timeout period T1 (e.g., three seconds) of the timer started in S614 has expired after a lapse of a predetermined time. If the timeout period T1 has expired, the system controlling unit 101 goes to S625, but otherwise returns to S618.

In S624, the system controlling unit 101 determines whether or not a timeout period T2 (longer than T1: e.g., five seconds) of the timer started in S614 has expired. If the timeout period T2 has expired, the system controlling unit 101 goes to S625, but otherwise returns to S618.

In S625, the system controlling unit 101 erases the displayed list of choices for the selected item. Consequently, the setting item hidden hitherto by the list becomes visible. In this way, the time until a list disappears due to a timeout varies with the selected item, and is shorter in the case of the setting item whose set value is expressed numerically on the setting item (setting item whose guide display is provided in the form of an item name).

In S626, the system controlling unit 101 determines whether or not the SET key 90 (set button) has been pressed. If the SET key 90 is pressed, the system controlling unit 101 goes to S627, but otherwise goes to S628.

In S627, the system controlling unit 101 displays a detailed setting window of the currently selected item on the display unit 111. Display examples of this are as shown in FIGS. 5A and 5B. Once the detailed setting window is displayed, a set value change command is accepted from the user. When a command to exit the detailed setting window is accepted, the system controlling unit 101 returns the user to the setting window and goes to S628.

In S628, the system controlling unit 101 determines whether or not a setting window exit command has been issued. The exit command is as described in S620. If there is no exit command, the system controlling unit 101 returns to S606 and repeats processing, and if there is an exit command, the system controlling unit 101 exits the setting window process.

In the example described above, the setting item 301 of shooting mode, setting item 302 of shutter speed, setting item 303 of aperture value, and setting item 304 of ISO sensitivity are arranged in the first row, i.e., the uppermost row. With this arrangement, a list is provided basically in the row directly below the selected item except for the fourth row located directly above the guide region. This mode of display keeps the setting item 301 of shooting mode, setting item 302 of shutter speed, setting item 303 of aperture value, and setting item 304 of ISO sensitivity from being hidden by the list.

However, if the setting item 301 of shooting mode, setting item 302 of shutter speed, setting item 303 of aperture value, and setting item 304 of ISO sensitivity are arranged in the second or subsequent row, there is a possibility that the setting items will be hidden by a list. To deal with such a case, a step can be provided to determine whether or not the setting item of any of shooting mode, shutter speed, aperture value and ISO sensitivity is placed in the row directly below the selected item if the determination result in S611 is No. Then, the system controlling unit 101 is designed to go to S613 if the setting item of any of shooting mode, shutter speed, aperture value, and ISO sensitivity is placed in the row directly below the selected item, but otherwise go to S612.

Note that the control performed by the system controlling unit 101 may be implemented by a single piece of hardware or that the entire apparatus may be controlled by plural pieces of hardware which share processing.

Whereas the present invention has been described in detail with reference to an exemplary embodiment, the present invention is not limited to the specific embodiment described above and various other embodiments are included in the present invention without departing from the spirit and scope of the invention.

Whereas an embodiment has been described above by citing an example in which the present invention is applied to a digital camera, the present invention is not limited to this example and is applicable to any imaging apparatus which provides a guidance display. Also, the present invention is applicable to any display controlling apparatus which displays plural setting items side by side. That is, the present invention is applicable to a digital single-lens reflex camera, digital video camera, PDA, cell-phone terminal, portable image viewer, music player, game machine and electronic-book reader. Also, the present invention is suitable for a camera control application on an apparatus, such as a smart phone or tablet, which remotely controls an imaging apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-244126, filed Dec. 2, 2014, which is hereby incorporated by reference herein in its entirety.

What is claimed is:

1. A display controlling apparatus comprising:
at least one memory and at least one processor, the at least one memory and at least one processor operating as units comprising:
(1) a selecting unit configured to select a setting item from a plurality of setting items which are displayed on a display unit, wherein the plurality of setting items are arranged in a plurality of rows;
(2) an operating unit configured to receive a changing operation by a user to change a set value relating to the setting item selected by the selecting unit; and
(3) a display controlling unit configured to control a displaying in a displaying region of a row, among the plurality of rows, adjacent to a row of the setting item selected by the selecting unit, so as to be changed from (a) displaying at least one or more setting items into (b) displaying a list of a plurality of candidate values capable of setting relating to the setting item selected by the selecting unit,
wherein the setting items displayed in the displaying region of the row adjacent to the row of the selected setting item before displaying the list are not displayed on the display unit after displaying the list, and
wherein the setting items displayed in a displaying region of rows, among the plurality of rows, other than the row adjacent to the row of the selected setting item before displaying the list are displayed continuously at identical positions on the display unit before and after displaying the list.

2. The display controlling apparatus according to claim 1, wherein the plurality of rows includes three or more rows.

3. The display controlling apparatus according to claim 1, wherein the display controlling unit performs to control so as not to display the list at a position on which a shutter speed, an aperture value, or a sensitivity of an imaging apparatus are displayed.

4. The display controlling apparatus according to claim 1, wherein the display controlling unit controls to display the list, in response to receiving the changing operation by the operating unit.

5. The display controlling apparatus according to claim 1, wherein the display controlling unit erases the display of the list, upon elapsing of a predetermined time, and displays the at least one setting item in the displaying region.

6. The display controlling apparatus according to claim 1, wherein the plurality of setting items includes (1) a first setting item indicating a set value as a numerical value, and (2) a second setting item indicating a set value as a configuration different from the numerical value.

7. The display controlling apparatus according to claim 6, wherein the first setting item is one of a shutter speed, an aperture value, and a sensitivity of an imaging apparatus.

8. The display controlling apparatus according to claim 6, wherein the display controlling unit sets a time length of displaying a second list of a plurality of candidate values capable of setting relating to the second setting item longer than a time length of displaying a first list of a plurality of candidate values capable of setting relating to the first setting item.

9. The display controlling apparatus according to claim 3, wherein the display controlling unit displays a guide relating to the setting item selected by the selecting unit, in a guide region in a setting window displayed to include the plurality of rows on which the plurality of setting items are arranged.

10. The display controlling apparatus according to claim 9, wherein the display controlling unit displays an item name of a first setting item of the plurality of setting items indicating a set value as a numerical value, and displays a set value of a second setting item of the plurality of setting items indicating the set value as the configuration different from the numerical value.

11. The display controlling apparatus according to claim 9, wherein the display controlling unit does not display the list in the guide region.

12. The display controlling apparatus according to claim 9, wherein, when a row under the selected setting item by one row does not include the guide region, the display controlling unit displays the list in the row under the setting item by one row, and
wherein when the row under the selected setting item by one row includes the guide region, the display controlling unit displays the list in a row above the setting item by one row.

13. The display controlling apparatus according to claim 12, wherein the display controlling unit displays, in a top row, a shutter speed, an aperture value, and a sensitivity of an imaging apparatus.

14. The display controlling apparatus according to claim 1, wherein, in response to a predetermined operation received by the operating unit, the display controlling unit displays a detailed setting window relating to the selected setting item, wherein the detailed setting window does not display setting items of the plurality of setting items other than the selected setting item.

15. The display controlling apparatus according to claim 14, wherein the detailed setting window includes the same configuration of the displaying as the list relating to the selected setting item.

16. A controlling method of a display controlling apparatus, the method comprising:
selecting a setting item from a plurality of setting items which are displayed on a display unit, wherein the plurality of setting items are arranged in a plurality of rows;
receiving a changing operation by a user to change a set value relating to the setting item selected in the selecting; and
controlling a displaying in a displaying region of a row, among the plurality of rows, adjacent to a row of the setting item selected by the selecting, so as to be changed from (1) displaying at least one or more setting items into (2) displaying a list of a plurality of candidate values capable of setting relating to the setting item selected by the selecting,
wherein the setting items displayed in the displaying region of the row adjacent to the row of the selected setting item before displaying the list are not displayed on the display unit after displaying the list, and
wherein the setting items displayed in a displaying region of rows, among the plurality of rows, other than the row adjacent to the row of the selected setting item before displaying the list are displayed continuously at identical positions on the display unit before and after displaying the list.

17. A non-transitory computer-readable recording medium storing a readable program for operating a computer to execute a controlling method of a display controlling apparatus, the method comprising:
selecting a setting item from a plurality of setting items which are displayed on a display unit, wherein the plurality of setting items are arranged in a plurality of rows;
receiving a changing operation by a user to change a set value relating to the setting item selected in the selecting; and
controlling a displaying in a displaying region of a row, among the plurality of rows, adjacent to a row of the setting item selected by the selecting, so as to be changed from (1) displaying at least one or more setting items into (2) displaying a list of a plurality of candidate values capable of setting relating to the setting item selected by the selecting,
wherein the setting items displayed in the displaying region of the row adjacent to the row of the selected setting item before displaying the list are not displayed on the display unit after displaying the list, and
wherein the setting items displayed in a displaying region of rows, among the plurality of rows, other than the row adjacent to the row of the selected setting before displaying the list are displayed continuously at identical positions on the display unit before and after displaying the list.

18. The display controlling apparatus according to claim 1, wherein before displaying the list, the display controlling unit displays a plurality of setting items in each of the plurality of rows.

19. The display controlling apparatus according to claim 1, further comprising:
an output unit configured to output image data to the display unit.

20. The display controlling apparatus according to claim 1, wherein a number of the rows displayed on the display unit is not changed between a timing before displaying the list and a timing after displaying the list, and the display controlling unit controls to display the list without adding a row to be displayed on the display unit.

* * * * *